(12) United States Patent
Cage et al.

(10) Patent No.: US 6,502,466 B1
(45) Date of Patent: Jan. 7, 2003

(54) SYSTEM AND METHOD FOR FLUID COMPRESSIBILITY COMPENSATION IN A CORIOLIS MASS FLOW METER

(75) Inventors: Donald R. Cage, Longmont, CO (US); Gabriel S. Dragnea, Longmont, CO (US)

(73) Assignee: Direct Measurement Corporation, Longmont, CO (US)

( * ) Notice: Subject to any disclaimer, the term of this patent is extended or adjusted under 35 U.S.C. 154(b) by 0 days.

(21) Appl. No.: 09/342,560

(22) Filed: Jun. 29, 1999

(51) Int. Cl.[7] .................................................. G01F 1/84
(52) U.S. Cl. .......................... 73/861.355; 73/861.356; 73/861.357
(58) Field of Search ..................... 73/861.355, 861.356, 73/861.357

(56) References Cited

U.S. PATENT DOCUMENTS

| | | |
|---|---|---|
| 4,262,523 A | 4/1981 | Stansfeld |
| 5,373,745 A | 12/1994 | Cage |
| 5,497,665 A * | 3/1996 | Cage et al. ............. 73/861.356 |
| 5,728,952 A * | 3/1998 | Yao et al. ............... 73/861.357 |
| 5,734,112 A * | 3/1998 | Bose et al. .............. 73/861.56 |
| 5,831,178 A * | 11/1998 | Yoshimura et al. ..... 73/861.357 |

* cited by examiner

Primary Examiner—Benjamin R. Fuller
Assistant Examiner—Corey D. Mack
(74) Attorney, Agent, or Firm—Henry C. Query, Jr.

(57) ABSTRACT

A Coriolis mass flowmeter having a flowtube and excitation circuitry, coupled to the flowtube, that can excite the flowtube at varying frequencies of vibration and a method of operating the same to compensate for effects of fluid compressibility. In one embodiment, the Coriolis mass flowmeter includes: (1) flowrate measurement circuitry, coupled to the flowtube, that measures a first mass flowrate of a fluid flowing through the flowtube at a first vibration frequency and a second mass flowrate of the fluid at a second vibration frequency and (2) fluid compressibility compensation circuitry, coupled to the flowrate measurement circuitry, that employs the first and second mass flowrates to determine a frequency response of the fluid and a fluid compressibility compensation adjustment from the frequency response.

26 Claims, 5 Drawing Sheets

SYSTEM AND METHOD FOR FLUID COMPRESSIBILITY COMPENSATION IN A CORIOLIS MASS FLOW METER

TECHNICAL FIELD OF THE INVENTION

The present invention is directed, in general, to Coriolis mass flow meters and, in particular, to Coriolis flow meters that take into account the compressibility of the fluids they measure.

BACKGROUND OF THE INVENTION

Coriolis flow meters were developed for practical industrial use in the late 1970's by companies such as Micro Motion of Longmont, CO. and others. Generally, a Coriolis mass flow meter is a device that measures mass flowrate of fluids passing through one or more flowtubes, or over surfaces that are intentionally vibrated to cause requisite Coriolis accelerations in the fluid. Some meters operate with parallel flowtubes in a bending mode of vibration, such as the D-series or Elite-series mass flow meters manufactured by Micro-Motion. Other meters operate with a single flowtube in a radial mode of vibration, such as the RMSA series meters manufactured by the assignee of the present invention.

The driven vibration of the flowtubes cause the mass flow stream inside the flowtubes to experience rotational velocity ($\Omega$) about an axis perpendicular to the fluid flow direction. This rotational velocity coupled with the velocity of the mass flow rate cause Coriolis accelerations according to the well known and generalized relationship of Equation 1:

$$Ac = 2(\Omega \times V) \qquad \text{Equation 1}$$

where:

Ac=the Coriolis acceleration;

$\Omega$=the rotational velocity of the fluid; and

V=the linear velocity of the fluid.

Since force is mass multiplied by acceleration, Coriolis Force induced can be determined by adding the mass of the fluid to Equation 1. This is shown in Equation 2:

$$Fc = -2 M^*(\Omega \times V) \qquad \text{Equation 2}$$

where:

Fc=the Coriolis force; and

M=the mass of the fluid.

The resulting Coriolis forces bear on the flowtube walls, causing the driven vibration pattern to be altered in amplitude, phase or both amplitude and phase, and in proportion to the mass flowrate. This is the fundamental relationship that is exploited in all Coriolis mass flowmeters.

Coriolis mass flow meters have enjoyed tremendous commercial success over the years, because most of them do not intrude into the stream of fluid, are accurate and measure true mass flowrate, at least in theory. Unfortunately, when Coriolis mass flow meters are called upon to measure the mass flow rate of compressible fluids, including most gasses (air, nitrogen, methane, ethylene, etc.) and vapors, the frequency response of the gasses or vapors greatly affects their accuracy. Even when measuring the same fluid, the errors incurred may change as a function of changes in the meters operating frequency or fluid parameters, such as pressure, temperature, density and specific heat. These errors may compound to an overall error of more than 10%, and can be highly dependent upon the design of the flowmeter and the characteristics of the fluid being measured. To complicate matters, while higher frequencies are desirable in terms of signal processing, meter response time and ambient vibration rejection, higher frequency flowtube vibrations tend to exacerbate this problem.

Therefore, what is needed in the art is a way to compensate for these compressibility effects, thereby allowing the inherent benefits of Coriolis mass flow measurement to be employed more effectively with respect to compressible fluids, and to allow Coriolis mass flowmeters to be effectively operated at higher frequencies.

SUMMARY OF THE INVENTION

To address the above-discussed deficiencies of the prior art, the present invention provides a Coriolis mass flowmeter having a flowtube and excitation circuitry, coupled to the flowtube, that can excite the flowtube at varying frequencies of vibration and a method of operating the same to compensate for effects of fluid compressibility. In one embodiment, the Coriolis mass flowmeter includes: (1) flowrate measurement circuitry, coupled to the flowtube, that measures a first mass flowrate of a fluid flowing through the flowtube at a first vibration frequency and a second mass flowrate of the fluid at a second vibration frequency and (2) fluid compressibility compensation circuitry, coupled to the flowrate measurement circuitry, that employs the first and second mass flowrates to determine a frequency response of the fluid and a fluid compressibility compensation adjustment from the frequency response.

Implicit in the relationship set forth in the Background of the Invention set forth above is the assumption that the rotational velocity term ($\Omega$) in equations (1) and (2), above, as delivered to the fluid by the flowtube wall, is felt simultaneously by the entire fluid stream and thereby causes a simultaneous and directly proportionate force (Fc) of the fluid back onto the wall. Here is the problem as it relates to compressible fluids.

A compressible fluid is itself a mass-spring-damper (MSD) system in which mass is represented by the fluid's density, stiffness is represented by the fluid's bulk modules of elasticity and damping is represented by the fluid's viscosity. (Bulk modulus of elasticity, k, is inverse to adiabatic compressibility, $\beta_0 = 1/\gamma p$.) For purposes of the present invention, however, "compressibility" is employed in a general sense to mean that a fluid in a contained volume can be compressed to a new volume by the application of work on the system, (i.e., forcing a piston to compress gas in a cylinder). All fluids are compressible to some degree; gasses tend to be more compressible than liquids.

As with any MSD system, the response of the system depends on values of the parameters involved (i.e., mass, spring constant, damping), along with boundary conditions. In the case of compressible fluid inside the flowtube of a Coriolis mass flowmeter, the fluid is accelerated perpendicular to the axis of the flowtube (across the flowtube diameter). Therefore, the important boundary conditions for this purpose are the dimensions and shape of the inside of the flowtube which, in combination with the fluid parameters, cause the existence of natural transverse resonances of the fluid vibrating within the confines of the flowtube. These natural transverse resonances give rise, in turn, to frequency response characteristics (evidenced in curves) relating the response of the fluid (pressure against the flowtube wall) to various frequency excitations.

Heretofore, Coriolis flowmeter signal processing has assumed that the fluid is incompressible and therefore that the fluid reacts instantly to the imposed accelerations from the flowtube wall. However, it can now be seen that compressible fluids will react according to their frequency response characteristics, as will be described in greater detail. If the frequency response characteristics were fixed, an initial calibration would compensate for errors. However, the shape of the frequency response curves may change as a function of changes in the flowtube and fluid parameters, such as fluid density, temperature, pressure, viscosity, molecular weight, etc. In addition, the excitation frequency of the flowmeter, which sets the operating point on the frequency response curve, is also subject to variations caused by fluid pressure, temperature, density, viscosity, pipeline stress, and others. Therefore, the resulting response of the device to mass flowrate is unpredictable unless the operating point on the operating frequency response curve is known. The present invention therefore describes several systems and methods of determining the shape of the frequency response curve, the operating point on the frequency response curve, or both, during operation of the meter and regardless of changing fluid and flowtube parameters.

Certain embodiments of the present invention take advantage of the observation that even though the frequency response curves appear complicated, having multitudes of natural resonances all contributing to the fluid's total response, the equation of the curve may be accurately reduced to one or two variables, which may easily be determined or assumed as hereinafter described. Since all the contributing natural resonances of the fluid are subject to the same boundary condition (the inside diameter or shape of the flowtube), the resulting resonance values bear a proportionate relationship to each other, even as gas parameters change. In these certain embodiments, the entire equation to be reduced (in its simplest form) to one variable. In one embodiment, knowing the basic form of the equation in terms of one variable allows the entire response curve to be approximated by obtaining only one additional piece of information.

In an embodiment to be illustrated and described, the additional piece of information is acquired by making a second flow measurement at a different frequency than the one at which the first measurement was taken. Since the response of the gas varies at different frequencies according to its response curve, a different flow measurement reading is attained at a different frequency. The variation between the flow measurements is functionally related to the frequency response of the gas. Therefore, by evaluating flow measurements taken at one operating frequency versus another, the frequency response characteristic of the gas can be determined, and the correct mass flowrate can be calculated, regardless of the fluid and its current characteristics.

In an alternative embodiment to be illustrated and described, the frequency response curve is determined by calculation based on fluid properties and the configuration of the flow meter. Once determined, the response value can be determined for the operating frequency of the flow meter, and the appropriate compensation applied.

In yet another embodiment, the frequency response curve is determined by finding one or more resonance points along its curve. Again, since the value of these resonance points bear a fixed relationship with each other, at a minimum, only one resonance point needs to be found to determine the entire curve with an acceptably high degree of accuracy. The curve, along with the frequency of the operating point or points of the flow meter, can then be employed to compensate for any changes in the frequency response characteristics of the fluid. In another embodiment, the frequency response of the fluid is determined directly by exciting the fluid and measuring its response through a frequency range or at specified points. This may be done with conventional magnet/coil transducers, piezoelectric transducers, or other conventional transducers or actuators.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Before describing certain embodiments of the present invention in detail, it should be stated that well-known mathematical techniques for solving certain differential equations describing the environment within which the present invention operates or the operation of certain embodiments of the present invention itself will be employed or referenced below. Those skilled in the pertinent art should understand however that the particular mathematical techniques employed are not the only mathematical techniques available to solve such equations, that reasonable minds may differ as to how such equations should be solved, and, most importantly, that the broad scope of the present invention depends in no way upon specific mathematical techniques for solving differential equations.

Various embodiments of the present invention will now be described wherein the frequency response characteristics of a compressible fluid are determined and the effects of those characteristics on mass flowrate measurement are compensated for by making two measurements of mass flowrate at different frequencies, and then applying a mathematical function to solve for the correct mass flowrate. The mathematical function is related to the mass flowrate measurements taken at two different frequencies.

All Coriolis flowmeters generally operate by accelerating the mass of a flowing fluid through some mechanism, such as a vibrating flowtube. This commonality of mass acceleration means that all Coriolis flowmeters are subject to the frequency response characteristics of the fluid being measured. For this reason, the present invention is not limited to a specific configuration for the Coriolis flowmeter. The present invention applies equally to single flowtube, multiple flowtube, straight flowtube, curved flowtube, bending mode, radial mode and other conventional or later-discovered configurations or operational modes of Coriolis mass flow meters.

For clarity, the illustrated embodiments of the present invention will be described with reference to a single straight flowtube Coriolis flow meter operating in a first radial mode of vibration. Also, the embodiments will be described in context of a comparison in measurement between two different fluids whose properties are significantly different, such as air and methane, so the correct mass flowrate result is reached in either case.

Figure 3:
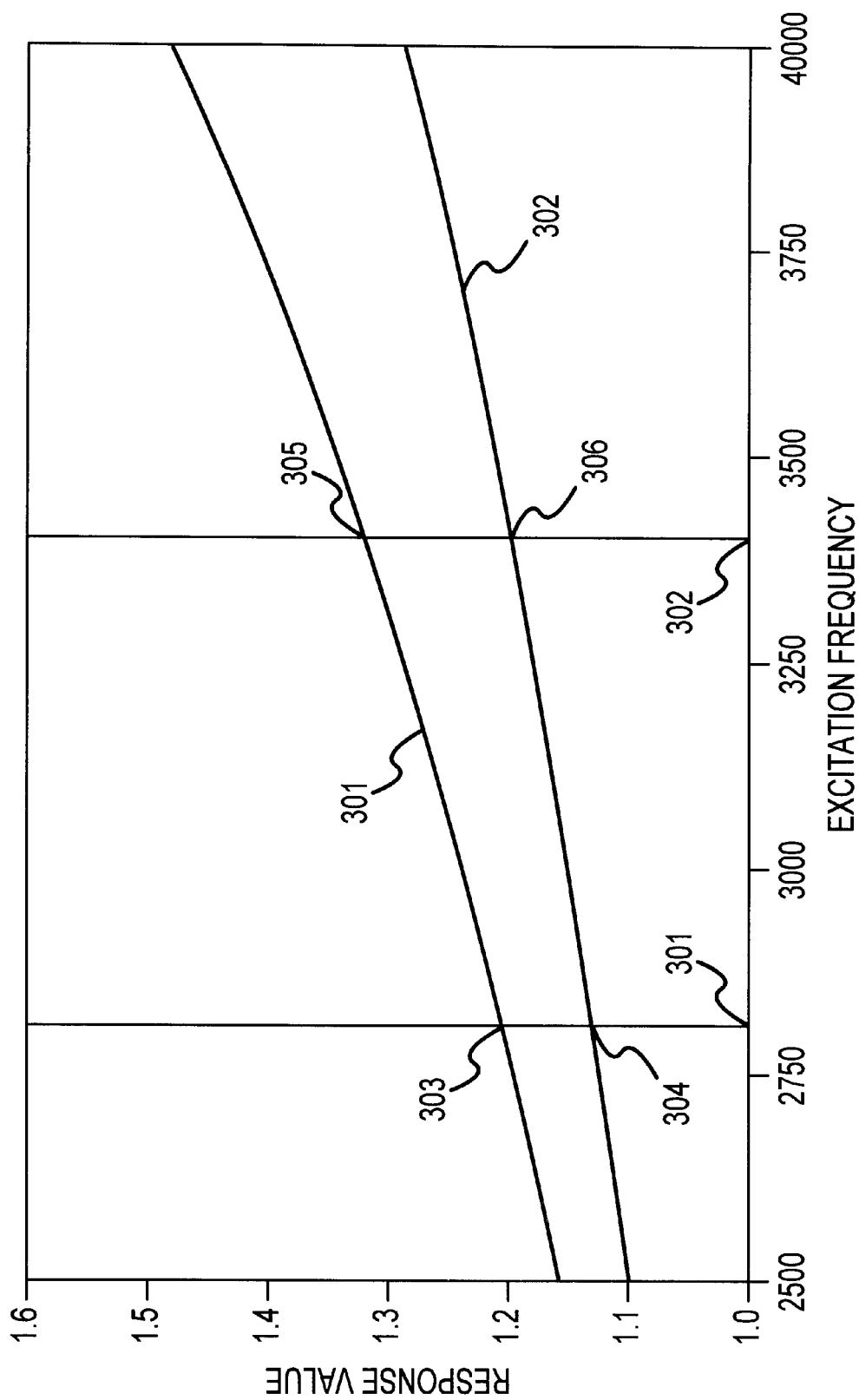
FIG. 3 illustrates a graphical representation of a portion of the response curves of FIG. 2 showing, in greater detail, particular frequencies at which a Coriolis flowmeter may operate.
Figure 4:
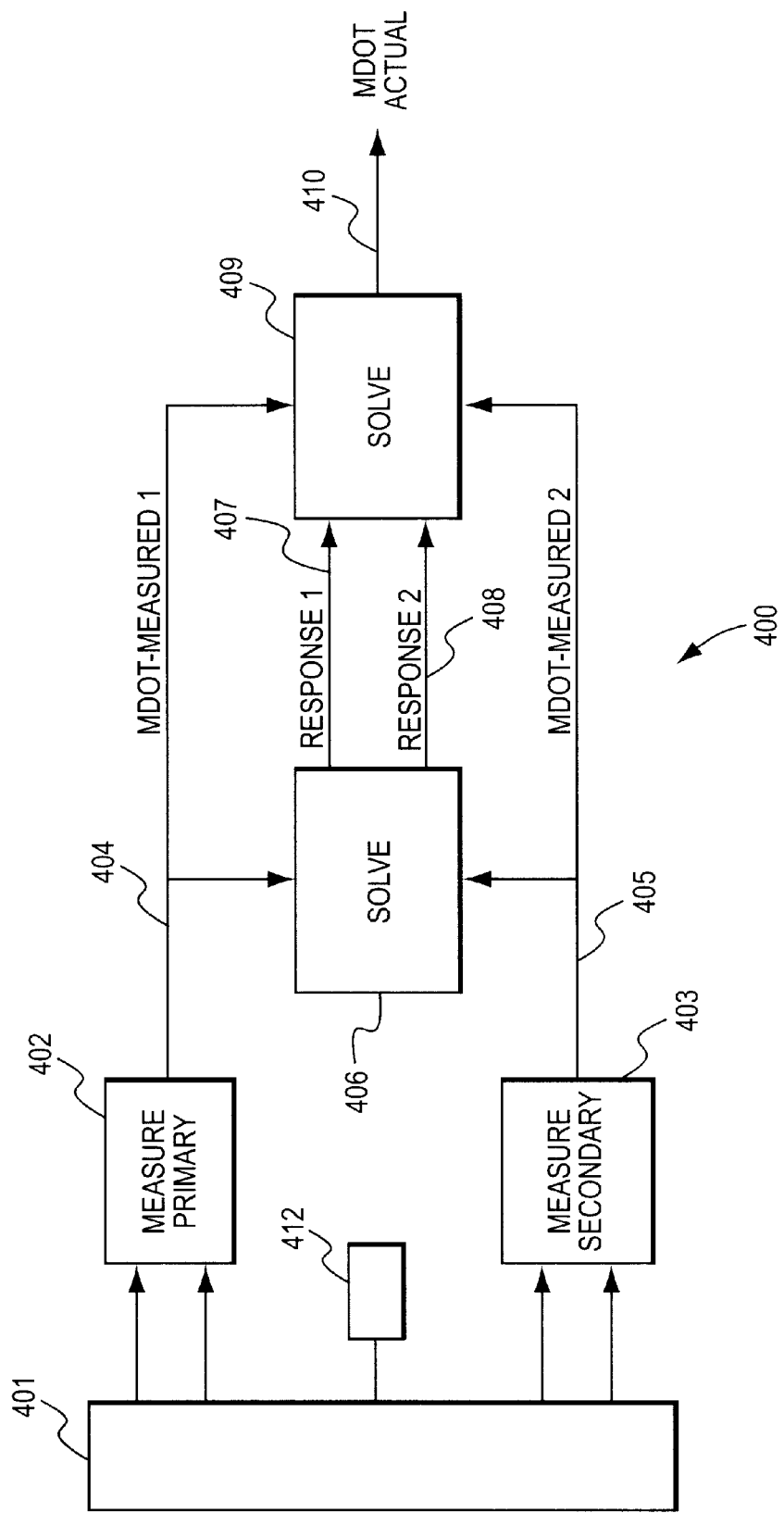
FIG. 4 illustrates a block diagram of signal processing circuitry embodying fluid compressibility compensation circuitry constructed according to the principles of the present invention or carrying out a method according to the principles of the present invention.
Figure 5:
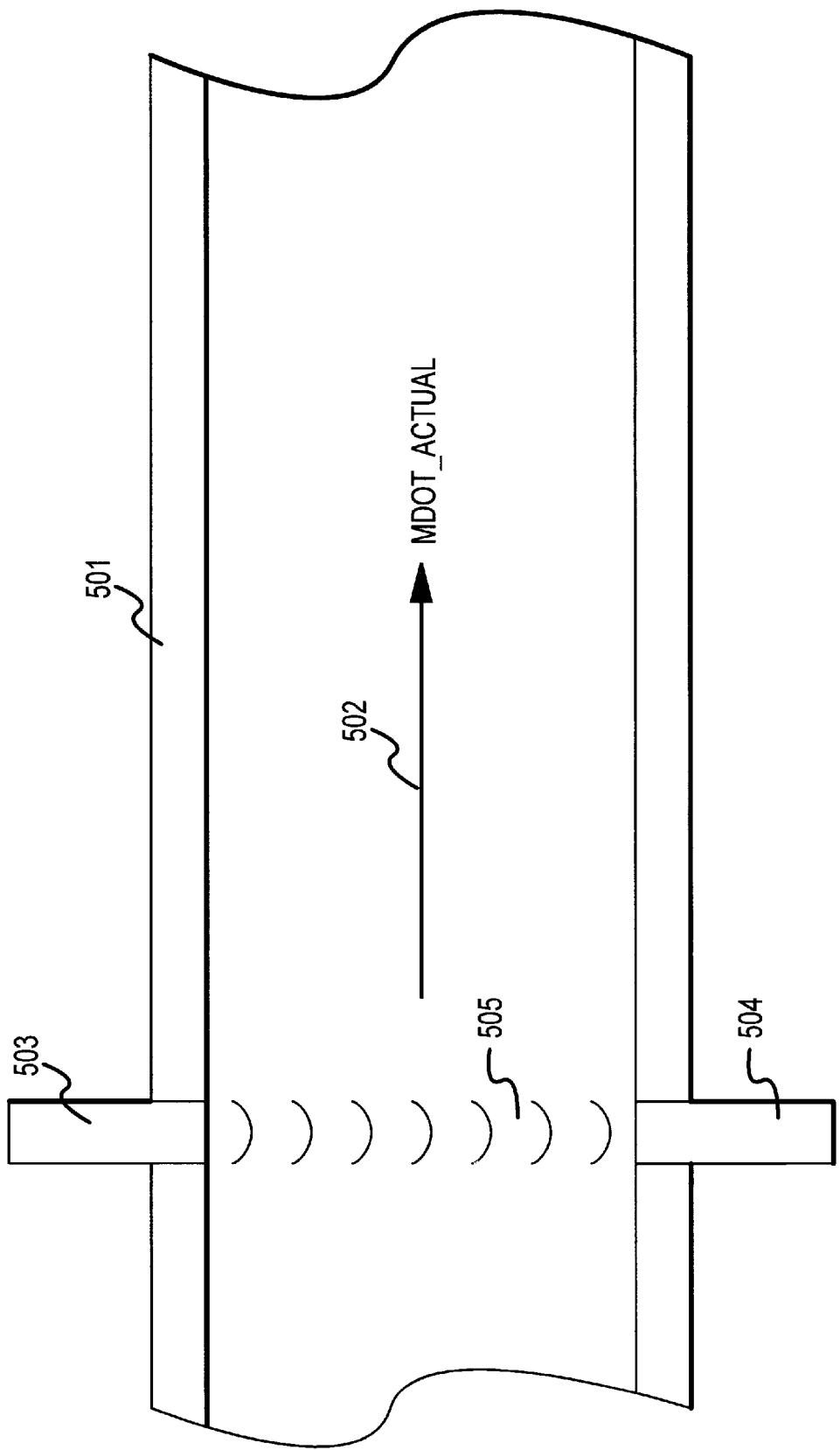
FIG. 5 illustrates an alternate method of exciting a fluid within a flowtube to achieve fluid compressibility compensation.

U.S. Pat. No. 5,497,665 (the "'665 patent" and incorporated herein by reference) illustrates and describes a progression of radial mode shapes in which a flowtube may be vibrated. FIG. 3 of the '665 patent illustrates a first order radial mode shape; FIG. 4 of the '665 patent illustrates a second order radial mode shape; FIG. 5 of the '665 patent illustrates third and fourth order radial mode shapes, respectively.

The configuration of the fluid containment area, however, does play a part in the frequency response determination in that, for example, in a flowtube having a round cross-sectional shape (the most common type), the inside diameter of the flowtube is the fundamental boundary condition that applies to the natural fluid modes of vibration. This diameter dimension, along with a multitude of fluid parameters including pressure, temperature, density, viscosity and molecular weight, determine the natural frequency and shape of the various fluid modes of vibration of the compressible fluid within the flowtube. In general, these various fluid modes of vibration of the compressible fluid are transverse to the flowtube axis (across the flowtube diameter). Other modes of vibration of the fluid may exist down the axis of the flowtube or due to other boundary conditions but the modes of vibration that are responsive to the Coriolis accelerations affect the response of the meter to mass flowrate.

Figure 1:
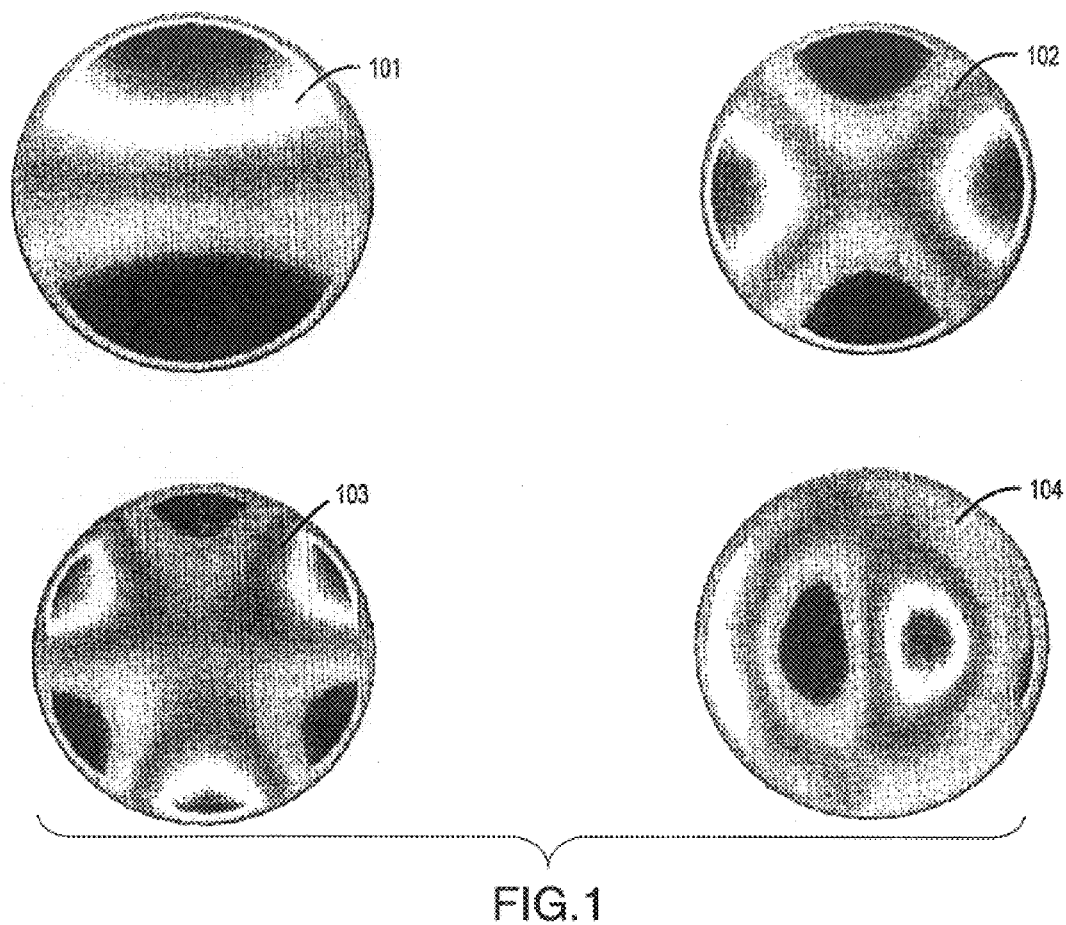
FIG. 1 illustrates a graphical representation of typical natural transverse fluid modes of vibration that a compressible fluid can have within the confines of a flowtube.

FIG. 1 illustrates a graphical representation, generated by finite element analysis, of typical natural transverse fluid modes of vibration that a compressible fluid can have in the confines of a flowtube. FIG. 1 shows a first curve 101 relating pressure distribution through the cross section of the flowtube of one of the natural transverse fluid modes of vibration of the compressible fluid. A second curve 102 relates pressure distribution through the cross section of the flowtube of another natural transverse fluid mode of vibration of the compressible fluid. Similarly, third and fourth curves 103 and 104 relate pressure distributions through the cross section of the flowtube for additional natural transverse fluid modes of vibration having higher natural frequencies than those modes related by the first curve 101 or the second curve 102.

It is the existence of natural modes of vibration of the fluid that causes the response of the gas to vary at different frequencies of excitation. The magnitude of the response value that affects the mass flow measurement depends on the shape of the operating frequency response curve, and, in general, increases in value from one at zero Hz excitation to a higher value at the first participating natural mode of vibration of the gas that is affected by the excitation.

Generally, a frequency response curve is a transfer function of a response value (such as a response force, pressure, deflection, acceleration or velocity at a specified point on the structure), to a given input (such as an input force, pressure, deflection, acceleration or velocity applied at a specified point on the structure), evaluated over a range of excitation frequencies of interest. For the purpose of the present discussion, the frequency response curves can be said to represent the response fluid pressure ("Coriolis pressure") at a representative point on the flowtube wall due to the induced Coriolis accelerations of the fluid flowing through the device, normalized to a reference value of one at zero frequency of excitation.

As stated above, the compressible fluid inside the flowtube is, itself, an MSD system that reacts to excitation according to a given frequency response curve that may be determined as hereinafter described. Generally, a MSD system that is harmonically excited (excited with sinusoidal excitation) follows a well known response curve having the general form of Equation 3, below.

$$Response1 = \frac{1}{\sqrt{\left(1 - \frac{(\Omega ex1)^2}{(\Omega nat1)^2}\right)^2 + \left(2\xi \frac{(\Omega ex1)}{(\Omega nat1)}\right)^2}} + \frac{1}{\sqrt{\left(1 - \frac{(\Omega ex1)^2}{(\Omega nat2)^2}\right)^2 + \left(2\xi \frac{(\Omega ex1)}{(\Omega nat2)}\right)^2}} + \frac{1}{\sqrt{\left(1 - \frac{(\Omega ex1)^2}{(\Omega nat3)^2}\right)^2 + \left(2\xi \frac{(\Omega ex1)}{(\Omega nat3)}\right)^2}} \ldots - (N-1) \quad \text{Equation 3}$$

where:
- $\Omega ex1$=the excitation frequency of the primary mode of vibration;
- $\Omega nat1$=the frequency of the first participating natural fluid mode of vibration;
- $\Omega nat2$=the frequency of the second participating natural fluid mode of vibration;
- $\Omega nat3$=the frequency of the third participating natural fluid mode of vibration;
- $\xi$=the damping ratio; and
- N=the number of terms summed in the equation (three shown in Equation 3).

Response1 is the additional Coriolis pressure response at a representative point on the flowtube wall, due to the induced Coriolis accelerations of the fluid flowing through the device, normalized to a value of one at zero frequency of excitation. By inspection of Equation 3, it can be seen that Response1 is one if $\Omega nat1$, $\Omega nat2$ and $\Omega nat3$ are infinite. This is the case for an incompressible fluid.

However, as $\Omega nat1$ becomes less than infinite in value and approaches the excitation value of $\Omega ex1$, Resonse1 is other than one. As stated above, it should be noted that no truly incompressible fluid actually exists, and that the degree of compressibility and the effect on frequency response must be determined for any particular meter design to verify whether fluid compressibility is significant. In general, as operating flowtube vibrations become higher in frequency and larger in diameter, and as the fluid to be measured becomes more compressible, correction in accordance with the teachings of the present invention becomes evermore necessary.

Response1 exists in the uncompensated mass flowrate measurement for any real compressible fluid being measured in any Coriolis mass flow meter. Response1 needs to be determined and, if significant, corrected or compensated for to determine the true mass flowrate value without the frequency response variable.

In equation 3, $\Omega ex1$ represents the excitation frequency of the first or primary vibration mode of operation of the flowtube, $\Omega nat1$ is the resonant frequency of the first participating natural mode of vibration of the compressible fluid and $\Omega nat2$ is the resonant frequency of the second participating natural mode of vibration of the compressible fluid. Additional $\Omega natN$ terms may be added to achieve the required accuracy. It is understood that additional terms yield higher accuracy, so only the first term, $\Omega nat1$, may be hereinafter employed (with the understanding that additional terms are assumed to be present as necessary for desired accuracy).

The term "participating," as used herein, means that a natural mode of vibration of the compressible fluid exists and substantially participates in the overall response curve shape. An infinite number of natural modes of vibration exist for compressible fluids. However, depending on the particular mode shape, certain ones of the natural modes may or may not be excited by the Coriolis accelerations. Even if excited, the natural modes may or may not cause responsive pressures against the flowtube wall that, in turn, cause responsive motions on the flowtube to be measured as a part of the mass flowrate measurement. For example, a Coriolis flowmeter operating in a bending mode has a different set of participating modes than a Coriolis flowmeter operating in a radial mode (bending modes shapes are common mode to radial mode shapes and vice versa).

Also in Equation 3, the modal damping ratio term is represented by the parameter $\xi$, which is related to fluid viscosity. This term may be assumed to be negligible for most gasses, resulting in simplification without sacrificing acceptable accuracy. For higher accuracy, $\xi$ can be determined by measuring the damping of the flowtube vibration through drive power requirements. A portion of the total drive power requirements for the device represents viscous losses in the fluid, and, as such, may be employed to determine an actual damping value for inclusion in the functions. Also, the damping term may be assumed from known properties of the fluid being measured and included in the calculation.

A "mass flowrate measurement," as that term is used herein, is generally any parameter that is measured, or calculated, from the device (e.g., velocity, phase, amplitude or time delay) that is then employed to determine the mass flowrate of the fluid (defined as Mdot_measured1 or Mdot_measured2). This value, as measured, contains both the true mass flowrate (defined as Mdot_actual) and a multiplier (Response1, as described above) that causes the measured mass flowrate to be in error. The Response1 value therefore needs to be determined and separated from the measured value.

Figure 2:
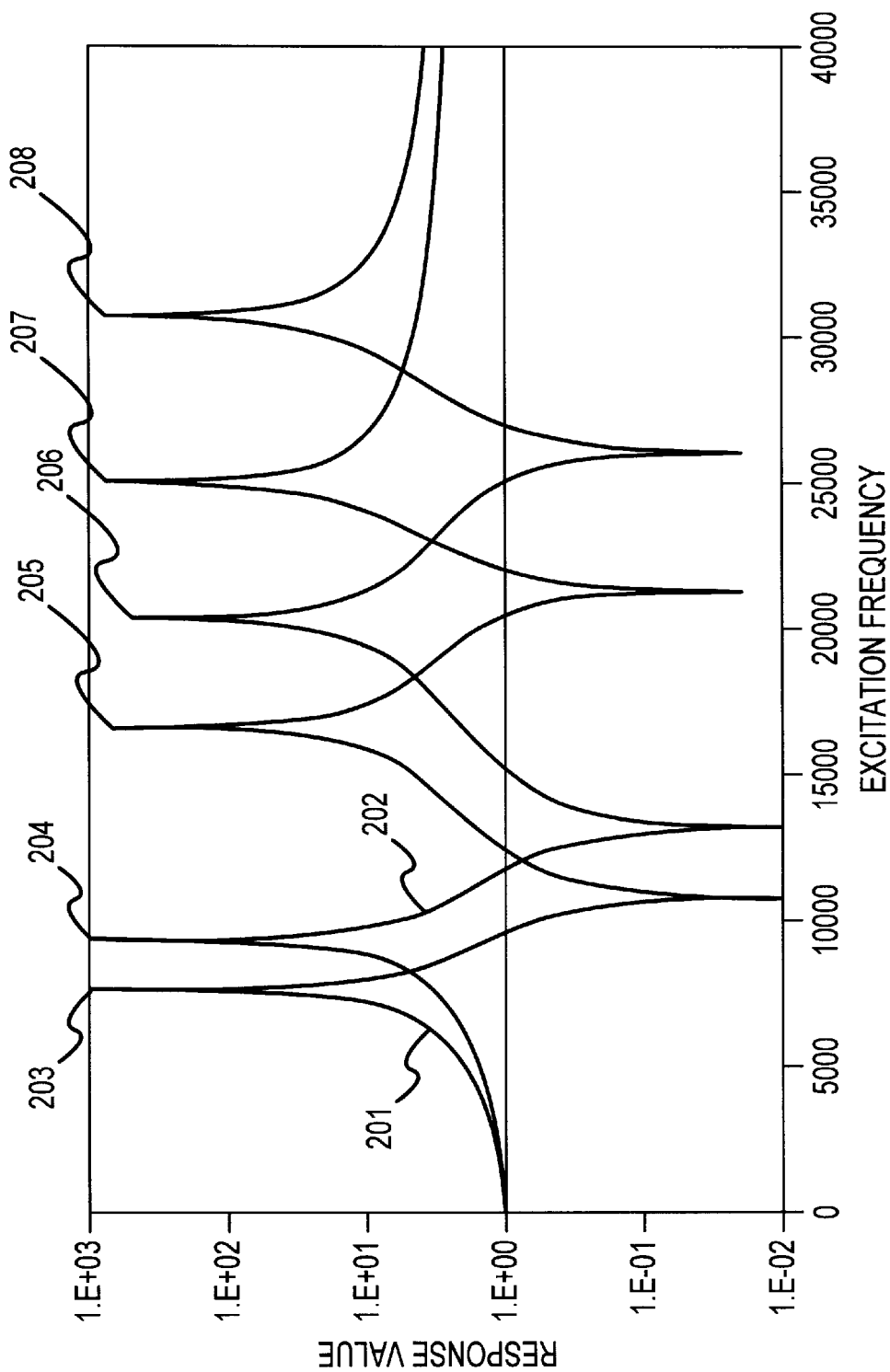
FIG. 2 illustrates a graphical representation of typical frequency response curves that could affect the response of a Coriolis mass flow meter working on a compressible fluid.

Turning now to FIG. 2, illustrated is a graphical representation of typical frequency response curves (designated as response curves 201, 202, respectively) that could affect the response of a Coriolis mass flow meter working on a compressible fluid. The response curve 201 represents the frequency response of, for example, air at a specified condition, and being excited by, for example, a radial flowtube vibration. Similarly, the response curve 202 represents the frequency response of, for example, methane at that same condition and being excited by that same type of flowtube vibration. Even a casual inspection of the response curves 201, 202 highlights the problem, since the response of the fluid is different at virtually all frequencies of excitation. Therefore, a flowmeter calibrated on one fluid will be inaccurate if later used on the other fluid without compensation according to the teachings of the present invention.

A resonant peak 203 of the response curve 201 has a frequency of, for example, 7500 Hz and is related to a natural fluid mode of vibration of the compressible fluid. Further, the response curve 201 has additional resonance peaks 205, 207 corresponding to higher participating modes at, for example, 16612 Hz and 25132 Hz, respectively.

Similarly, the response curve 202 (representing methane) may have resonant peaks 204, 206, 208 corresponding to resonant participating modes of the fluid at, for example, 9200 Hz, 20378 Hz and 30829 Hz, respectively.

Although the response curves 201, 202 look complicated and non-linear, they may be accurately described in terms of at least one variable. Since all the participating natural fluid modes of vibration of a compressible fluid are subject to the same boundary conditions (i.e., the inside diameter of the flowtube), the modes have a proportionate relationship with each other, allowing the additional terms of Equation 3 involving the higher modes of vibration ($\Omega nat2$, $\Omega nat3$, $\Omega nat4$ ... ) to be expressed in terms of the first mode $\Omega nat1$. For example, the relationships between the participating modes can be determined by finite element analysis or by modal analysis to determine the frequency response curve for a given fluid at a given condition. Then, by determining the ratio of second participating natural transverse fluid mode of vibration to the first (R1), and ratio of the third to the first (R2), etc., all the participating response frequency values may be expressed in terms of the first (or any other single mode) as in Equation 4 below.

Using the exemplary values of the peaks of the response curve 201, it can be determined that R1 is therefore about 2.215, R2 is therefore about 3.351, and so forth. Accordingly, these values are the same for the response curve 202 as they will be for any compressible fluid with these boundary conditions.

$$Response1 = \frac{1}{\sqrt{\left(1 - \frac{(\Omega ex1)^2}{(\Omega nat1)^2}\right)^2 + \left(2\xi \frac{(\Omega ex1)}{(\Omega nat1)}\right)^2}} + \frac{1}{\sqrt{\left(1 - \frac{(\Omega ex1)^2}{(R1*\Omega nat1)^2}\right)^2 + \left(2\xi \frac{(\Omega ex1)}{(R1*\Omega nat1)}\right)^2}} + \frac{1}{\sqrt{\left(1 - \frac{(\Omega ex1)^2}{(R2*\Omega nat1)^2}\right)^2 + \left(2\xi \frac{(\Omega ex1)}{(R2*\Omega nat1)}\right)^2}} \ldots - (N-1) \qquad \text{Equation 4}$$

Turning now to FIG. 3, illustrated is a graphical representation of a portion of the response curves 201, 202 of FIG. 2 showing, in greater detail, particular frequencies at which a Coriolis flowmeter may operate. More specifically, FIG. 3 shows more clearly the frequency response curves 201, 202 in the frequency range in which an exemplary 2" radial mode Coriolis flowmeter may operate, around 1000 to 4000 Hz. Operating in the first radial mode shape, an exemplary 2" meter may vibrate still more specifically at a frequency 301 of 2800 Hz, and at this frequency may have two alternative response values 303, 304, depending on whether the appropriate operating response curve is the response curve 201 (air) or the response curve 202 (methane), per the example.

When the basic mass flowrate signal is measured in the primary mode of operation of the flowmeter, the mass flowrate value attained already contains the response of the fluid response (Response1) as a multiplier to that value as shown in Equation 5.

$$M\text{dot\_measured1} = M\text{dot\_actual} * \text{Response1} \qquad \text{Equation 5}$$

where:

Mdot_measured1=the uncompensated mass flowrate measurement from the primary mode of vibration operation of the flowmeter; and Mdot_actual=the actual mass flowrate.

Equation 5 shows that two unknowns exist in the measurement: a) Mdot_actual, which is the goal to determine, and b) Response1, which is contaminating the measurement of the true mass flowrate. Two independent equations are required to determine two unknowns. In one embodiment of the present invention, two independent equations result from taking separate mass flowrate measurements at a different frequencies holding the mass flowrate constant. Even though the mass flowrate is held constant, a different flowrate response (Mdot_measured2) is measured according to Equation 6.

$$M\text{dot measured2} = M\text{dot actual} * \text{Response2} \qquad \text{Equation 6}$$

where:

Mdot_measured2=the uncompensated mass flowrate measurement from the secondary mode of vibration operation of the device.

Measuring mass flowrate at a higher frequency 302 results in alternative response values 305, 306, depending again on whether the appropriate operating response curve is the response curve 201 (air) or the response curve 202 (methane).

In the illustrated embodiment of the present invention, the secondary measurement frequency is achieved by operating the meter in a secondary mode of vibration, preferably the next higher natural mode of flowtube vibration of the same type. For example, if the primary mode of operation is a first order radial mode, then the preferred secondary mode for secondary measurement is the second radial mode shape, in which the phase of the radial shape reverses once along the flowtube length. Continuing in the example, this may be a frequency 302 of about 3400 Hz. As a further example, if the primary operation of the flowmeter is a first order bending mode, the preferred secondary mode for the secondary measurement is the second bending mode shape (in which the phase of the bending shape reverses once along the length of the flowtube).

While it may not be necessary (depending upon coupling) for the secondary flowtube mode shape to be of the same type as the first (radial versus bending), it is preferred, since the frequency response curves are the same for higher order radial modes as for lower order radial modes, but are, in general, different between radial and bending modes, thereby complicating scaling of the measured response changes. For example, for radial modes, the secondary mode could be the second, third or fourth radial mode, or higher (in fact, higher modes are advantageous, since they tend to be separated from the resonant peak of the fluid response). Similarly, if a bending mode is chosen, the secondary mode could be the second, third or fourth bending mode (and so on).

It should be noted, however, that the present invention is not limited to any particular modes or types of modes, and that virtuality any combination of modes and mode types may be used to practice the present invention, as long as the Response2 value at the secondary mode is different from the Response1 value at the primary mode as fluid properties change.

Alternately, instead of using a different mode of vibration, the primary mode of vibration may be employed twice by shifting its frequency to a different operating point on the operating response curve. This may be achieved by forcing a vibration at an arbitrary frequency point, not necessarily at a natural mode of vibration, or by shifting the natural mode of vibration to a different frequency through mechanical means (e.g., application of spring, mass or damping forces or stresses). Although fully within the broad scope of the present invention, this method is not preferred.

In the illustrated embodiment, use of the second radial mode for the secondary mass flowrate measurement produces an Mdot_measured2 according to Equation 6, above, and involving a Response2 as in Equation 7, below, where the difference from $$Response2 = \frac{1}{\sqrt{\left(1 - \frac{(\Omega ex2)^2}{(\Omega nat1)^2}\right)^2 + \left(2\xi \frac{(\Omega ex2)}{(\Omega nat1)}\right)^2}} \ldots - (N-1) \qquad \text{Equation 7}$$

Equation 5 is that the primary excitation frequency $\Omega ex1$ of Equation 5 is replaced with $\Omega ex2$ of the secondary vibration mode (second radial mode), and the additional terms are assumed as previously mentioned. This Response2 value then corresponds to alternative response values 305, 306 of FIG. 3, depending on whether the operating response curve is the response curve 201 (air) or the response curve 202 (methane). Since fluid properties are not assumed to be known in normal flow measurement, only Mdot_measured1 and Mdot_measured2 and the primary frequency 301 and the secondary frequency 302 are employed to determine the Mdot_actual flowrate.

By comparing the mass flowrate measurements in the primary mode and the secondary mode, the actual response values (Response1 and Response2) can be determined for either or both modes and the true mass flowrate (Mdot_actual) may thus be calculated as follows.

In the preferred embodiment, the means of comparison is done by first taking a ratio of the two measured mass flowrates attained by the two driven vibration modes, essentially Equation 5 divided by Equation 6, above, which cancels the Mdot_actual terms (thereby appearing in both numerator and denominator) resulting in equation 8:

$$\frac{M\text{dot\_measured2}}{M\text{dot\_measured1}} = \qquad \text{Equation 8}$$

$$\frac{\frac{1}{\sqrt{\left(1 - \frac{(\Omega ex2)^2}{(\Omega nat1)^2}\right)^2 + \left(2\xi \frac{(\Omega ex2)}{(\Omega nat1)}\right)^2}}}{\frac{1}{\sqrt{\left(1 - \frac{(\Omega ex1)^2}{(\Omega nat1)^2}\right)^2 + \left(2\xi \frac{(\Omega ex1)}{(\Omega nat1)}\right)^2}}} + \ldots$$

Equation 8 can then be solved for the one remaining unknown value: $\Omega nat1$. (This assumes $\zeta$ is negligible, provided as a known value or separately measured as described above and also assumes that the frequencies of operation, $\Omega$ex1 and $\Omega$ex2, are known, since they may be easily determined in by way of signal processing). In the example, $\Omega$nat1 corresponds to the first natural mode frequencies 7500 Hz or 9200 Hz corresponding to the response curves 201, 202, respectively.

Once $\Omega$nat1 is determined, $\Omega$nat1 can be substituted back into either or both of Equations 4 or 7 to determine the actual Response1 or Response2 values, or both, for the primary or secondary driven vibration modes, respectively. Once either or both of the Response1 or Response2 values are known, they can be employed in either of Equations 5 or 6, respectively, to determine Mdot_actual for either or both driven modes of vibration.

Turning now to FIG. 4, illustrated is a block diagram of signal processing circuitry embodying fluid compressibility compensation circuitry constructed according to the principles of the present invention or carrying out a method according to the principles of the present invention.

Referring to FIG. 4, an exemplary Coriolis mass flowmeter 400, such as the type described in the aforementioned U.S. Pat. No. 5,497,665, is shown to comprise a flowtube 401 through which a fluid to be measured is directed and conventional excitation circuitry 412 for vibrating the flowtube at various frequencies of vibration in a manner well understood by those of ordinary skill in the art. Circuitry 402 is employed to measure the mass flowrate of a compressible fluid in a primary mode of vibration at a primary frequency. The circuitry 402 calculates the Mdot_measured1 value 404. Similarly, circuitry 403 is employed to measure the mass flowrate of a compressible fluid in a secondary mode of vibration at a secondary frequency. The circuitry 403 calculates the Mdot_measured2 value 405. The Mdot_measured1 value 404 and the Mdot_measured2 value 405 are then employed in circuitry 406 to solve for either or both of the Response1 value 407 and/or the Response2 value 408 as described herein. Circuitry 409 then solves for the Mdot_actual mass flowrate value 410 using either or both of the Response1 or Response2 values and either or both of the Mdot measured1 or Mdot_measured2 values using the equations described herein.

In FIG. 4, the circuitry 402 and 403 individually measure the mass flowrates using their respective modes of vibration. This may be done either sequentially by switching back and forth between the two modes of operation, or simultaneously by operating on both modes at once. The simultaneous method is preferred so that no information is lost during a transition between modes when using the sequential method.

To simplify the solution of equations as described above, an alternate method of solution will now be explained. Referring back to FIGS. 2 and 3, since the response curves 201, 202 are well behaved (have no inflection points or singularities) the response curves 201, 202 lend themselves to simplified equations, rendering the above described solutions for Response1 and Response2 and Mdot_actual simpler.

One simplified approach is to model the response curves 201, 202 as simple polynomials as in Equations 9 and 10 below.

Response1=1+$A1*\Omega$nat1*$\Omega$ex1+$A2*\Omega$nat1*$\Omega$ex1$^2$+
$A3*\Omega$nat1*$\Omega$ex1$^3$...      Equation 9

Response2=1+$A1*\Omega$nat1*$\Omega$ex2+$A2*\Omega$nat1*$\Omega$ex1$^2$+
$A3*\Omega$nat1*$\Omega$ex2$^3$...      Equation 10

Previously, use was made of the fact that the relationships between the participating natural modes remain fixed constants regardless of the fluid properties. This caused the equations to be simplified to one unknown. Similarly, using the polynomial approach of Equations 9 and 10, the same may be done by finding fixed relationships between the constants of of the terms of the characteristic polynomial. For example, employing Equations 4 and 7 as the operating response curve equations and the constants R1, R2, R3 (and so on), the coefficients of equations 9 and 10 above can be determined.

As before, higher order terms relate to higher accuracy at the cost of complexity of computation. Therefore, application-dependent accuracy requirements determine the number of terms required in the solution.

By converting Response1 and Response2 (Equations 4 and 7) into polynomials (Equations 9 and 10), simple and well known methods may be employed in the computations for solution. For example, Chapter 9 of "Numerical Recipes in C," Cambridge University Press, second edition, ISBN 0-521-43108-5, outlines methods for finding roots of nonlinear sets of equations and in particular, §9.5 outlines many methods of finding the roots of polynomials.

As a practical matter, initial calibration of the meter could include individual calibrations on both intended modes of vibration on a known fluid. The known fluid may be a relatively "incompressible" fluid, such as a stiff liquid, or a compressible fluid with a known response curve for the meter. During this initial calibration, the measured response of the device should reflect the characteristics of the calibration fluid. For example, if the device is calibrated on an "incompressible" fluid, then the ratio of Mdot_measured2 to Mdot_measured1 should be one (since all the $\Omega$nat1 terms in Equations 4 and 7 above are infinite for an incompressible fluid). Alternately, if the meter is calibrated on air at 600 psia and 68° F., then the ratio of Mdot_measured2 to Mdot_measured1 corresponds to a predetermined response curve for the meter and the gas under those conditions.

As an alternate to the first embodiment illustrated and described above, the operating frequency response curve can be determined by calculation based on fluid properties and the configuration of the flow meter. Once determined, either or both of the Response1 and Response2 values of Equations 4 and 7 can be determined for the operating frequency of either or both modes of the flow meter, and the appropriate compensation applied.

In the embodiment illustrated and described above, $\Omega$nat1 was first determined by Equations 4 and 7. Alternatively, $\Omega$nat1 may be determined by calculation based on known fluid properties and flowtube configuration (which determines fluid mode boundary conditions). For example, it can be shown that a closed form equation may be applied to determine the $\Omega$nat1 frequency in the form of exemplary Equations 11 and 12 below.

$$\Omega nat1 = C1\left(\sqrt{\frac{(P*\gamma*(d*C2))}{\rho*V}}\right) \quad \text{Equation 11}$$

$$\Omega nat1 = C1*\left(Vsonic\sqrt{\frac{((d+C2))}{V}}\right) \quad \text{Equation 12}$$

where:

C1=a first coefficient;

C2=a second coefficient;

P=the pressure;

$\gamma$=the ratio of constant pressure and constant volume specific heats;

r=the density;

d=the flowtube diameter;

V=flowtube volume (area multiplied by unit length); and
Vsonic=the speed of sound in the fluid.

Equations 11 and 12 are exemplary in form. The exact coefficients to apply must be determined for a given flowtube configuration and mode of flowtube vibration, since these parameters determine the participating fluid modes of vibration which, in turn, determine the equation for the operating response curves. Since this alternative method depends upon fluid parameters, such as pressure, density and constant pressure or constant volume specific heats (which may be difficult to acquire or measure), it may be less accurate than the direct method as explained in the earlier embodiment.

As a second alternative to the first embodiment illustrated and described above, a different method of determining and compensating for compressible fluid effects will now be described. In this second alternate method, the natural resonant frequency of one or more of the compressible fluid modes is determined directly by excitation. Once determined, those values may be employed in Equations 4 or 7, above, to determine either or both of the operating Response1 or Response2 values. Either or both of the operating Response1 or Response2 values can then be employed as before in Equation 5 or 6 to determine Mdot_actual.

One method of directly determining the value of $\Omega nat1$ directly is to excite the gas in the flowtube over a range of frequencies and measure the acoustic response to that excitation. Accordingly, the acoustic response of the gas exhibits peaks at the natural resonant frequencies of the compressible fluid modes. More specifically, the drivers on the flowtube (usually magnets and coils) may be employed for this purpose, or additional transducers, such as piezoelectric type (employed for ultrasonic flow velocity measurement) as shown in FIG. 5, may be employed to excite the fluid in the flowtube.

Turning now to FIG. 5, illustrated is an alternate method of exciting a fluid within a flowtube to achieve fluid compressibility compensation. FIG. 5 shows a flowtube 501 carrying a massflow 502. A vibration transducer 504 is positioned to excite vibrations 505 across the diameter of the flowtube 501. The vibration transducer 504 is positioned to measure the vibrations 505 from the vibration transducer 503 across the diameter of the flowtube 501. By measuring the response to the excitation from the vibration transducer 503, peaks, located at the natural resonances of the fluid, can be determined. These peaks allow for the determination of $\Omega nat1$, or a related natural fluid frequency that can be correlated to $\Omega nat1$ through coefficients. A single transducer 503 may also be employed by itself both to transmit and sense the vibrations 505.

Unfortunately, additional response peaks (resonant modes of the flowtube itself or other related structures) may be concurrently sensed using this method. These additional response peaks may substantially complicate the determination of $\Omega nat1$. Here, advantage may be taken of the earlier-described proportional relationship between the natural resonant transverse fluid modes, not only to determine the location of a single peak, but all the peaks. For example, if one resonant peak is measured by this method at, for example, 7500 Hz, to verify that it is $\Omega nat1$, the earlier defined R1 constant can be employed to predict the frequency of $\Omega nat2$ as R1*$\Omega nat1$ (7500 * 2.215=16612 Hz). By looking for the existence of a similar response at 16612 Hz, the measured response at 7500 Hz can be identified as either the true $\Omega nat1$ natural transverse fluid mode, or some extraneous response of the structure. Higher levels of verification may thus be achieved by looking for even higher modes using constants R2, R3, etc. The entire response curve "signature" may therefore be sought until accurately determined. Once found, the response value, Response1, can be determined from Equation 4, and the mass flowrate subsequently determined through Equation 5, above.

Alternately, a "standing wave" 505 of, for example, $\Omega nat1$ can be excited by the transducer 503 across the diameter of the flowtube 501 and maintained by a servo loop to track this value which may then be used as before in Equation 4 above.

As a third alternative to the first embodiment illustrated and described above, the operating response curve of the gas may be directly measured at a particular frequency or over a range of frequencies in question, and then the resulting response value or values applied according to Equation 4, above. Here, instead of locating peaks and then using a knowledge of the operating response curve shape of Equations 4, 7 or both, the direct response of the fluid may be measured and employed directly in Equations 5 or 6 as follows.

Referring again to FIG. 5, a sending transducer 503 and a receiving transducer 504, such as a piezoelectric type, may be positioned across the diameter of the flowtube 501, such that the distance between the sending transducer 503 and the receiving transducer 504 is proportional to the diameter of the flowtube 501. These transducers 503, 504 are preferably of the piezoelectric or magnet/coil type, but may be of any type and remain within the broad scope of the present invention. By sending constant or known amplitude pressure waves 505 across the diameter of the flowtube 501 at the operating frequency of the primary measurement vibration $\Omega ex1$ and measuring the amplitude of the response received at the other side (Response1), the operating response curve may be directly measured and its value directly substituted into Equations 5 or 6, above, to allow Mdot_actual to be determined directly. Additionally, a range of frequency values may be "swept" across the fluid stream, and a range of response values thus determined. By sweeping over a range of frequencies, a section of the first and second response curves 201, 202 (of FIG. 1) may then be quantified, allowing values at any point along the first and second response curves 201, 202 to be determined and employed in Equations 5 or 6, above.

A method will now be described wherein the driven operating frequency of the flowtube may be employed along with standard equations of state of a fluid (taken for this example from the well-known National Institute for Standards Technology (NIST)-12 database) to solve for the natural frequency of the fluid $\Omega nat1$ in the flowtube which may then be employed in Equations 4, 7, and 8 above to solve for either or both of Response1 or Response2.

The natural frequency of vibration of a flowtube in a Coriolis mass flow meter is principally a function of the mass and stiffness of the flowtube itself, including pressure-stiffening effects of any pressurized fluid within the flowtube, plus the additional effects of fluid inside the flowtube acting as an "auxiliary" MSD system coupled to the original flowtube system. This auxiliary MSD system alters the natural vibration frequency and response to excitation of the original flowtube system according to the well known equation as described in §6 of the "Shock and Vibration Handbook" (McCraw-Hill Professional Publishing, 4$^{th}$ edition 1995; ISBN 0-07-026920-3).

$$\text{Resp\_coupled} = \frac{(1-Ba^2)}{(1-Ba^2)(1-Bo^2)-(Bo^2*U)} \quad \text{Equation 13}$$

where damping terms have been omitted for simplification, and:

Ba=Ωexcite/Ωnat1;

Bo=Ωexcite/Ωo;

Ωex=the excitation frequency;

Ωnat1=the natural uncoupled frequency of the auxiliary system;

Ωo=the natural uncoupled frequency of the original system; and

U=the mass of the auxiliary system divided by the mass of the original system.

Equation 13 describes the response of the coupled combination of the original flowtube system and an auxiliary MSD system (the fluid inside the flowtube). The response reaches a peak value where the denomintor of Equation 13 equals zero. This occurs at an excitation frequency equal to the natural frequency of the coupled system "Ωnat_coupled," where:

$$\Omega\text{nat\_coupled} = \frac{\sqrt{2*\sqrt{\Omega nat1^4(1+U^2+2U)+2\Omega nat1^2\Omega o^2(U-1)+\Omega o^4}+2\Omega nat1^2(1-U)+2\Omega o^2}}{2} \quad \text{Equation 14}$$

Equation 14 describes the natural frequency of the coupled system of the flowtube with the auxiliary fluid system inside, which is the normal operating driven frequency of the flowtube.

The Ωo frequency for the flowtube can be written as a polynomial in terms of temperature and pressure, as follows:

$$\Omega\text{nat\_uncoupled} = \Omega\text{ref} + k1*T + k2*P \quad \text{Equation 15}$$

where:

k1=a first constant determined by calibration;

k2=a second constant determined by calibration; and

Ωref=the natural frequency at some reference temperature and pressure, usually taken at zero pressure and ambient temperature.

Likewise, since the mass and volume of the flowtube may be assumed to be a constant, the parameter "U" in Equations 13 and 14 above can be written in terms of the density (r) of the fluid, multiplied by a constant, as:

$$U = k3*r \quad \text{Equation 16}$$

Also, the Ωnat1 frequency can be written as a function of the speed of sound in the fluid and a constant relating the configuration of the tube wall boundary conditions, as:

$$\Omega nat1 = k4*V\text{sonic} \quad \text{Equation 17}$$

By substituting Equations, 17, 16 and 15 into 14, the natural frequency of the coupled system (which is known, since it is the driven operating frequency of the system) can be rewritten in terms of pressure, temperature, density and Vsonic.

Since temperature is easily measured, and with a known temperature and for a given fluid pressure and density have a fixed relationship from which Vsonic can be calculated, Equation 14 can be written in terms of density and temperature, thereby reducing Equation 14 to one unknown: density. Once solved for the one unknown, then the value of Ωnat1 frequency is computed and substituted into Equations 4, 7 and 8 above as the Ωnat1 term to solve for Response1 and/or Response2.

Many equations and data are available that relate pressure to density and temperature as just described, such as the NIST-12 database, which gives equations of state for many known fluids in terms of:

pressure=density*temperature*constant+(sum of higher order density and temperature terms)      Equation 18

Similarly, Vsonic can also be written in the same way in terms of:

Vsonic=density*temperature*constant+(sum of higher order density and temperature terms)      Equation 19

While equations of state for pressure (such as Equation 17, above) are readily available, equations for Vsonic are not as readily available and may have to be determined for a given fluid by fitting available data to equation form.

Alternately, an iteritive method may be employed, whereby Equation 15 above is solved for pressure, which can then be applied, with temperature, to the NIST-12 equations to determine an approximate state for the known fluid. The corresponding values for pressure, density and Vsonic can then be applied to Equation 14 above and solved for new values of Ωnat1 until the solution converges to within a predefined tolerace level.

As an alternative the above-described method of determining Ωnat1 using the driven frequency of the flowtube in combination with standard equations of state, the frequency of additional natural modes of vibration of the flowtube can be determined and employed instead of standard equations of state to determine Ωnat1 for the fluid. Ωnat1 can then be employed in Equations 4, 7 and 8, above, to solve for Response1, Response2 or both.

In the example described immediately above, Equation 14 was characterized in terms of temperature, density, pressure and Vsonic, with temperature being known and the relationship among pressure, density and Vsonic fixed in accordance with standard equations of state for a known fluid. Here, the three unknowns are solved using three independent equations, which are the frequencies of three natural modes of vibration of the flowtube (for example, the first, second and third radial modes of vibration for a radial mode type flowmeter).

An independent equation for the natural coupled frequency, Ωnat_coupled, is written in the form of Equation 14, above, with By constants k1–k4 determined by calibration in Equations 15–17 before substitution into Equation 14, above, for each of the three modes of vibration. The three equations can then be simultaneously solved for the three unknowns using standard numerical methods, such as the Newton-Raphson method. (For further information regarding the well-known Newton-Raphson method, see §9.6 of "Numerical Recipes in C," cited above.) Once the three unkowns are determined, Equation 17 can then be solved for Ωnat1, which, in turn, can be employed in Equations 4, 7 and 8, above, to determine Response1, Response2 or both.

In a separate embodiment of the present invention, once the effect on mass flow rate measurement due to compressibility effects is known, the drive signal(s) provided to excite the flowtube, rather than the signal representing the resulting motion of the flowtube, can be modified to compensate for the compressibility effects. This, may be thought of "precompensating" the drive signal(s) for compressibility effects.

Although the present invention has been described in detail, those skilled in the art should understand that they can make various changes, substitutions and alterations herein without departing from the spirit and scope of the invention in its broadest form.

What is claimed is:

1. A Coriolis mass flowmeter comprising:

a flowtube through which a fluid to be measured is permitted to flow;

excitation circuitry coupled to said flowtube which is operable to vibrate said flowtube at at least first and second vibration frequencies;

flowrate measurement circuitry coupled to said flowtube which measures a first mass flowrate of said fluid at the first vibration frequency and a second mass flowrate of said fluid at the second vibration frequency; and fluid compressibility compensation circuitry coupled to said flowrate measurement circuitry which computes a frequency response of said fluid from said first and second mass flowrates and calculates an adjusted mass flowrate of said fluid from said frequency response.

2. The Coriolis mass flowmeter as recited in claim 1 wherein said first vibration frequency corresponds to a vibration selected from the group consisting of:

a bending mode of vibration, and a radial mode of vibration.

3. The Coriolis mass flowmeter as recited in claim 1 wherein said first vibration frequency corresponds to a vibration selected from the group consisting of:

a first mode of vibration, a second mode of vibration, a third mode of vibration, and a fourth mode of vibration.

4. The Coriolis mass flowmeter as recited in claim 1 wherein said second vibration frequency corresponds to a vibration selected from the group consisting of:

a bending mode of vibration, and a radial mode of vibration.

5. The Coriolis mass flowmeter as recited in claim 1 wherein said second vibration frequency corresponds to a vibration selected from the group consisting of:

a first mode of vibration, a second mode of vibration, a third mode of vibration, and a fourth mode of vibration.

6. The Coriolis mass flowmeter as recited in claim 1 wherein said fluid compressibility compensation circuitry employs a formula relating said first mass flowrate to said second mass flowrate.

7. The Coriolis mass flowmeter as recited in claim 1 wherein said fluid compressibility compensation circuitry employs a formula that relates participating response frequency values to a particular mode of vibration.

8. A Coriolis mass flowmeter comprising:

a flowtube through which a fluid to be measured is permitted to flow;

excitation circuitry coupled to said flowtube which is operable to vibrate the flowtube at at least first and second vibration frequencies;

flowrate measurement circuitry coupled to said flowtube which measures a first mass flowrate of said fluid at the first vibration frequency; and fluid compressibility compensation circuitry coupled to said flowrate measurement circuitry which determines at least one resonant frequency of said fluid, computes a frequency response of said fluid from said first mass flowrate and said resonant frequency and calculates an adjusted mass flowrate of said fluid from said frequency response.

9. The Coriolis mass flowmeter as recited in claim 8 wherein said first vibration frequency corresponds to a vibration selected from the group consisting of:

a bending mode of vibration, and a radial mode of vibration.

10. The Coriolis mass flowmeter as recited in claim 8 wherein said first vibration frequency corresponds to a vibration selected from the group consisting of:

a first mode of vibration, a second mode of vibration, a third mode of vibration, and a fourth mode of vibration.

11. The Coriolis mass flowmeter as recited in claim 8 wherein said frequency response of said fluid is determined with respect to one selected from the group consisting of:

a first transverse fluid mode of vibration, a second transverse fluid mode of vibration, a third transverse fluid mode of vibration, a fourth transverse fluid mode of vibration, first and second transverse fluid modes of vibration, first, second and third transverse fluid modes of vibration, and first, second, third and fourth transverse fluid modes of vibration.

12. The Coriolis mass flowmeter as recited in claim 8 wherein said fluid compressibility compensation circuitry determines said at least one resonant frequency of said compresible fluid by performing one selected from the group consisting of:

exciting and measuring said at least one resonant frequency using magnets and coils, exciting and measuring said at least one resonant frequency using piezoelectric transducers, exciting and measuring a standing wave frequency, exciting and measuring a range of frequencies, calculating said at least one resonant frequency from known properties of said compressible fluid and a configuration of said Coriolis mass flowmeter.

13. The Coriolis mass flowmeter as recited in claim 8 wherein said fluid compressibility compensation circuitry determines said at least one resonant frequency as a function of one selected from the group consisting of:

a ratio of constant pressure and constant volume specific heats of said fluid, and a speed of sound in said fluid.

14. For use with a Coriolis mass flowmeter having a flowtube and excitation circuitry, coupled to said flowtube, that can excite said flowtube at varying frequencies of vibration, a method of compensating for fluid compressibility, comprising:

measuring a first mass flowrate of a fluid flowing through said flowtube at a first vibration frequency;

measuring a second mass flowrate of said fluid at a second vibration frequency;

employing said first and second mass flowrates to determine a frequency response of said fluid; and employing said frequency response to determine a fluid compressibility compensation adjustment.

15. The method as recited in claim 14 wherein said first vibration frequency corresponds to a vibration selected from the group consisting of:

a bending mode of vibration, and a radial mode of vibration.

16. The method as recited in claim 14 wherein said first vibration frequency corresponds to a vibration selected from the group consisting of:

a first mode of vibration, a second mode of vibration, a third mode of vibration, and a fourth mode of vibration.

17. The method as recited in claim 14 wherein said second vibration frequency corresponds to a vibration selected from the group consisting of:

a bending mode of vibration, and p1 a radial mode of vibration.

18. The method as recited in claim 14 wherein said second vibration frequency corresponds to a vibration selected from the group consisting of:

a first mode of vibration, a second mode of vibration, a third mode of vibration, and a fourth mode of vibration.

19. The method as recited in claim 14 wherein said employing said first and second mass flowrates comprises employing a formula relating said first mass flowrate to said second mass flowrate.

20. The method as recited in claim 14 wherein said employing said first and second mass flowrates comprises employing a formula that relates participating response frequency values to a particular mode of vibration.

21. For use with a Coriolis mass flowmeter having a flowtube and excitation circuitry, coupled to said flowtube, that can excite said flowtube at varying frequencies of vibration, a method of compensating for fluid compressibility, comprising:

measuring a first mass flowrate of a fluid flowing through said flowtube at a first vibration frequency;

determining at least one resonant frequency of said compressible fluid; and correcting for a frequency response of said fluid as a function of said first mass flowrate and said at least one resonant frequency.

22. The method as recited in claim 21 wherein said first vibration frequency corresponds to a vibration selected from the group consisting of:

a bending mode of vibration, and a radial mode of vibration.

23. The method as recited in claim 21 wherein said first vibration frequency corresponds to a vibration selected from the group consisting of:

a first mode of vibration, a second mode of vibration, a third mode of vibration, and a fourth mode of vibration.

24. The method as recited in claim 21 wherein said frequency response of said fluid is determined with respect to one selected from the group consisting of:

a first transverse fluid mode of vibration, a second transverse fluid mode of vibration, a third transverse fluid mode of vibration, a fourth transverse fluid mode of vibration, first and second transverse fluid modes of vibration, first, second and third transverse fluid modes of vibration, and first, second, third and fourth transverse fluid modes of vibration.

25. The method as recited in claim 21 wherein said determining comprises performing one selected from the group consisting of:

exciting and measuring said at least one resonant frequency using magnets and coils, exciting and measuring said at least one resonant frequency using piezoelectric transducers, exciting and measuring a standing wave frequency, exciting and measuring a range of frequencies, calculating said at least one resonant frequency from known properties of said compressible fluid and a configuration of said Coriolis mass flowmeter.

26. The method as recited in claim 21 wherein said determining comprises determining said at least one resonant frequency as a function of one selected from the group consisting of:

a ratio of constant pressure and constant volume specific heats of said fluid, and a speed of sound in said fluid.

* * * * *